Feb. 6, 1951  J. D. CHRISTIAN  2,540,099
DRIVEN DRUM POWER TERMINAL
Filed May 4, 1949  4 Sheets-Sheet 1

INVENTOR.
Joseph D. Christian
BY
Robert N. Benroff
ATTORNEY

Feb. 6, 1951   J. D. CHRISTIAN   2,540,099
DRIVEN DRUM POWER TERMINAL
Filed May 4, 1949   4 Sheets-Sheet 3

INVENTOR
Joseph D. Christian
BY
Robert D. Benroff
ATTORNEY

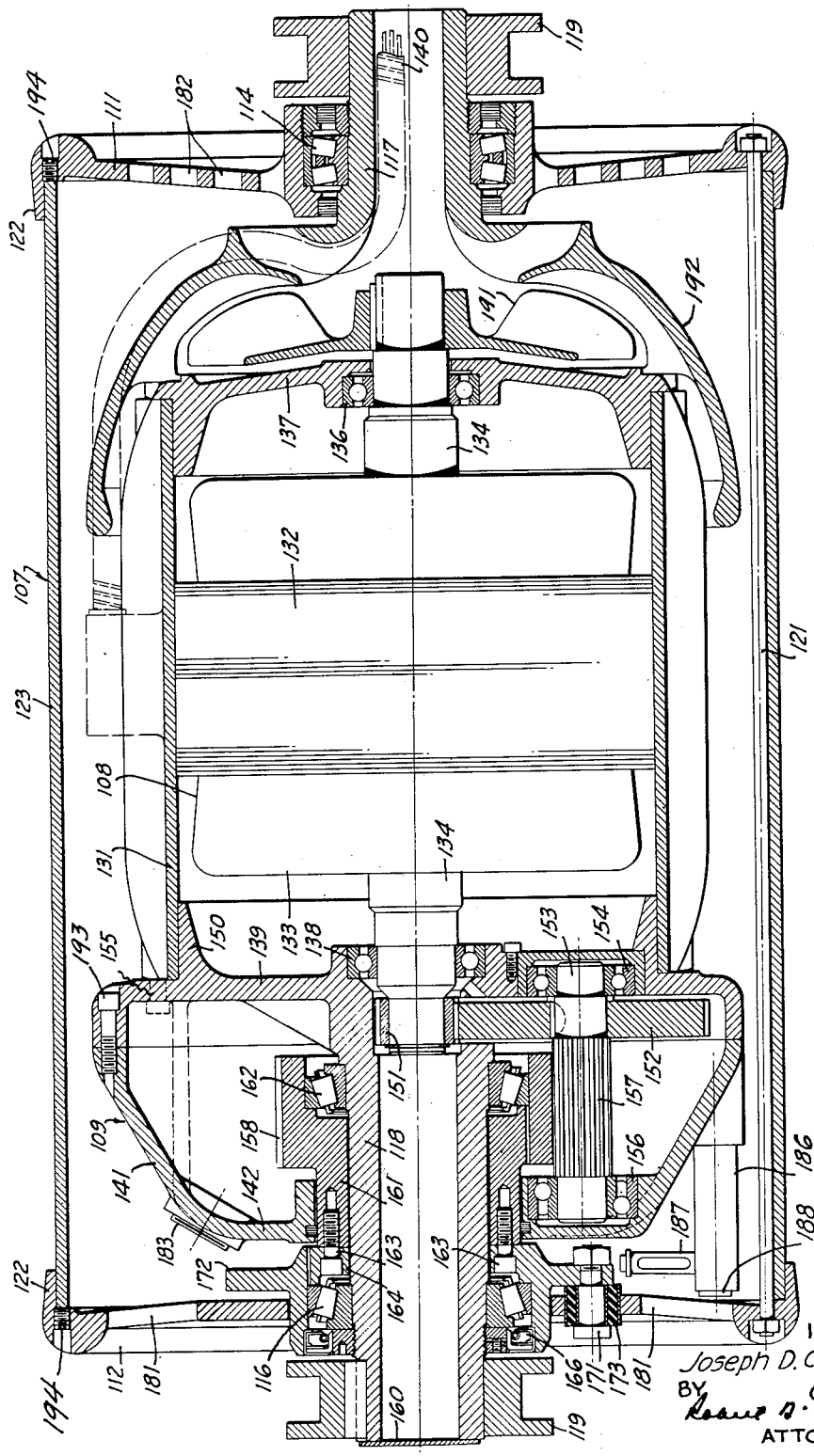

Patented Feb. 6, 1951

2,540,099

UNITED STATES PATENT OFFICE 2,540,099

DRIVEN DRUM POWER TERMINAL

Joseph D. Christian, San Francisco, Calif.

Application May 4, 1949, Serial No. 91,291

20 Claims. (Cl. 74—421)

This invention relates to a driven drum power terminal in which the driving means, including a prime mover and a reduction gear device, are enclosed within the drum which in turn provides a power take-off.

Many conveyor drives are provided by a flexible conveyor device such as a belt or several chains or cables trained about a driven pulley or sprocket pair at one end and about an idler pulley or sprocket pair at the other end. The driven pulley or sprocket pair is usually mounted on a suitably journalled shaft which is in turn driven by an independent prime mover through an independent but intermediate speed change device, such as a gear reducer or an arrangement of belts and pulleys or gears and sprockets. Such installations take up considerable space and require the careful alignment of the various separate and independent components; necessarily, they are exceedingly heavy, initially expensive and costly to maintain.

In accordance with this invention, I provide a unitary power terminal structure in which the driven drum element provides a container for the prime mover and the speed change device; the structure need only be mounted on a suitable foundation and supplied with power to be ready for use. Thus, the entire structure is self-contained and can be installed and utilized as a unit in any desired location. More particularly, the unitary power terminal structure of this invention includes a suitable base on which the driven drum is mounted for rotation. Within the drum are mounted the prime mover and the speed change device for driving the drum at a desired speed; the prime mover and the speed change device are fixed and do not rotate although they assist in providing rotational support for the drum. It is also contemplated that the drum can be driven by an external prime mover in the event the drum-contained prime mover should fail.

One of the objects of the present invention is to provide a driven drum in which the driving mechanism, including the prime mover, is enclosed within the drum, making for compactness and simplicity of installation.

Another object of the invention is to drive a drum by a contained prime mover, as an electric motor, and a train of gears arranged to drive the drum at a desired speed from the drum-contained prime mover.

A further object is to provide in such a device, design features making for simple assembly and disassembly in case of necessary repairs, together with the possibility of driving by external means in case the contained prime mover should fail.

A still further object is to provide a device of this type which constitutes a packaged power unit suited to many specifically different applications merely by slight changes in the surface of the drum.

The device of the present invention is particularly characterized in that the prime mover and speed change unit are so arranged within the driven drum that air circulation takes place transversely of the drum, entering at one end of the drum and issuing from the other end of the drum, so that adequate cooling for the speed change device and for the prime mover is provided.

Another object of the present invention is to provide a driven drum unit in which the driving mechanism, including a prime mover and a speed change device is enclosed in the drum in such a fashion that air circulation can take place completely through the drum.

Another object of the present invention is to provide a self-contained driven drum device in which the prime mover and speed change device can be mounted in any one of a plurality of drums of different sizes.

A further object of the present invention is to provide a driven drum device of the character described in which the driving connection to the drum from the prime mover-speed change unit is through a flexible connection so that a simple and inexpensive form of drum, such as one made of a length of rolled steel boiler plate, can be employed.

The invention includes other objects and features of advantage, some of which, together with the foregoing, will appear hereinafter wherein the present preferred form of the device of this invention is disclosed.

In the drawing, Figure 1 is a horizontal section of the device wherein certain parts are shown in plan.

Figure 6 is a vertical section through a modified form of a packaged power terminal embodying the present invention.

The device which is the subject of this invention may be, and herein will be, described specifically as applied to a driven drum, specifically a smooth face drum intended to operate as the driving terminal of a wide belt conveyor. However, the outer surface of the drum may take any one of several configurations. It may be only a flat pulley as is hereinafter described, or the surface may be grooved for the ordinary multiple V belt and used as a source of power; the drum may have sprockets secured to its outer surface to constitute a drive for a chain conveyor or a chain hoist.

Figure 1:
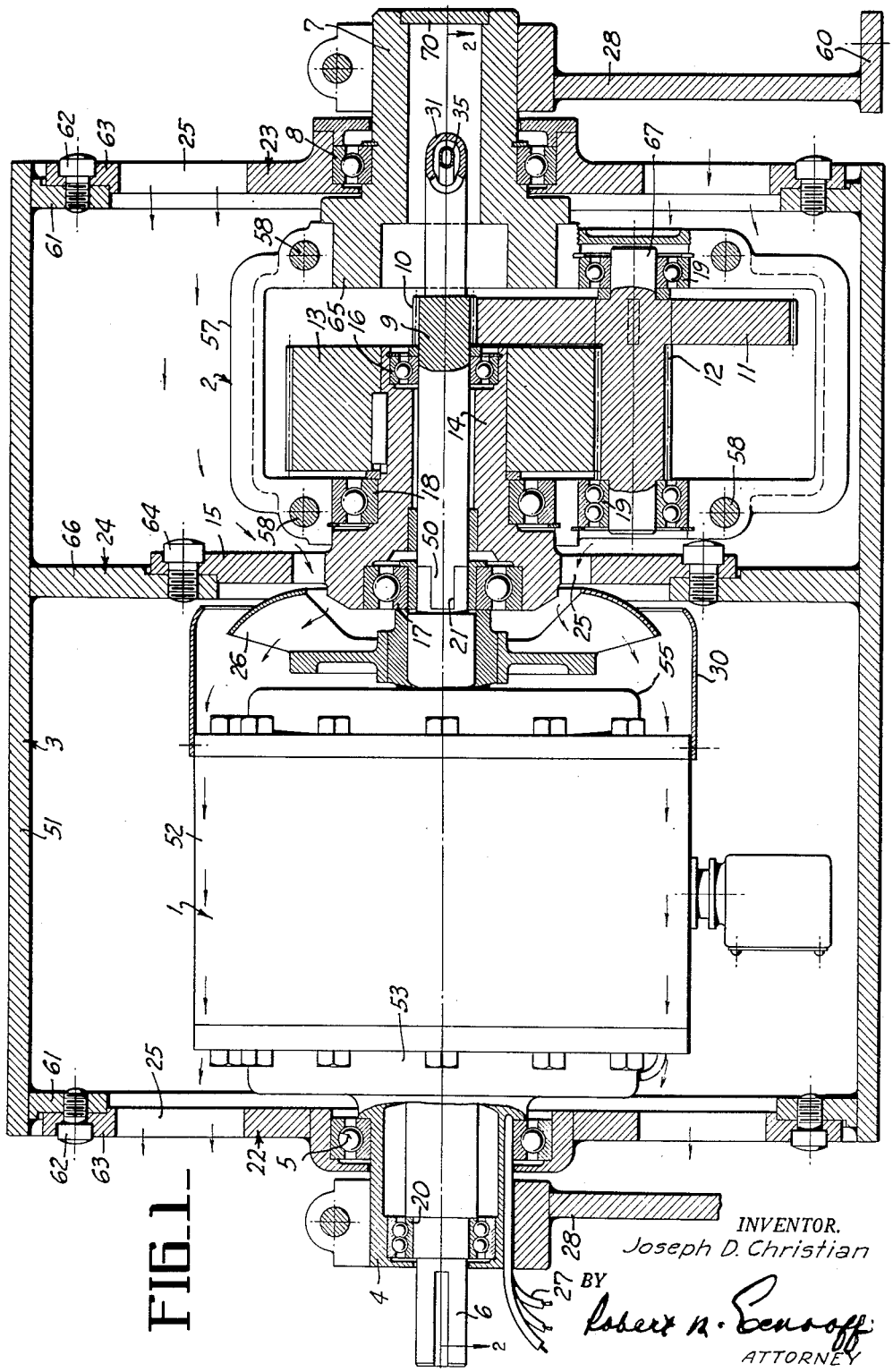
Figure 2:
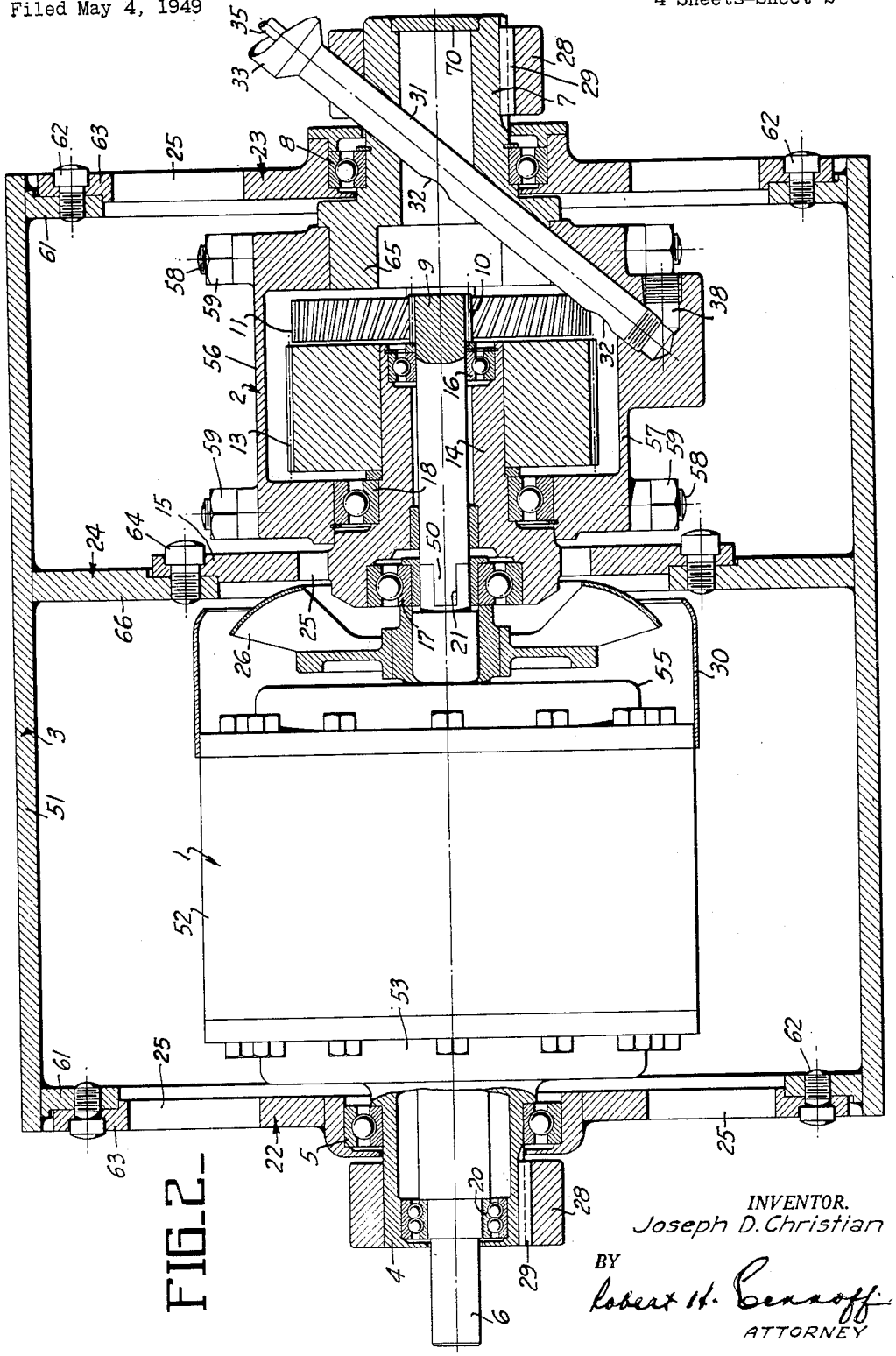
Figure 2 is a vertical section of the device shown in Figure 1 in which certain parts are in elevation.
Figures 3, 4, 5:
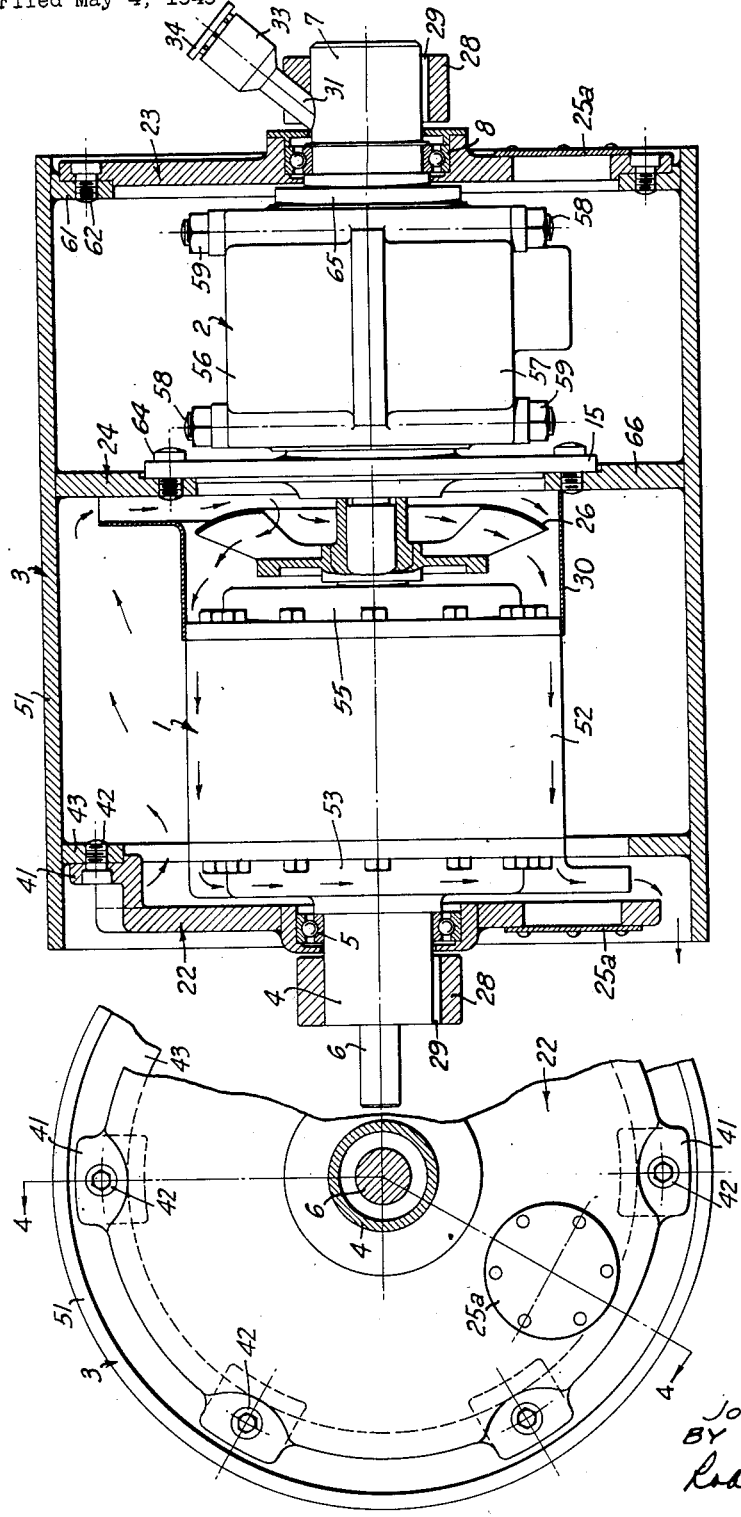
Figure 3 is an end view of a modified form of the invention, part being broken away.
Figure 4 is a section taken along the line 4—4 of Figure 3.
Figure 5 is a sectional detail view of the lubrication fitting.

In the drawings and particularly in Figures 1, 2 and 3, the three major elements of the device are indicated as prime mover 1, a speed change device or gearbox 2, and the outer drum 3, the whole being mounted between arms 28 which are in turn supported from a suitable unitary base 60. As has been indicated, the prime mover 1 and speed change device 2 are fixed non-rotatably within the rotatably supported drum. The drum includes an outer cylindrical shell 51, two end walls 22 and 23, and an intermediate wall 24. Walls 22 and 23 are provided by circular discs 61 secured by screws 62 to annular flanges 63 on the drum ends. Wall 24 includes a disc 15 secured by screws 64 to interior annular flange 66 provided intermediate the drum ends.

The prime mover 1 includes a casing 52 having an end bell 53 at one end which terminates in an extension 4. The extension 4 is secured by a key 29 in one of the arms 28 and provides a support for a bearing 5 which is mounted in drum wall 22 to provide for rotational support for one end of the drum. Shaft 6 from the prime mover, in this instance an electric motor, extends beyond the adjacent arm 28 to permit of connection to an external prime mover, if this be desired. In order to utilize this, there need be only secured to this shaft a pulley, sprocket wheel, flexible coupling, or any other device to connect this shaft to a suitable source of power, whereupon the drum may be driven as desired. Shaft 6 is supported by bearing 20 in end bell 53 and by another bearing (not shown) in the other end bell 55 to maintain the proper air-gap relation between the motor rotor and stator. The prime mover is supported concentrically with respect to the drum by bearings 20 and 5 at one end of the motor shaft and by bearing 17 supporting the other end of the motor shaft in wall 24.

The speed change device 2 includes upper and lower casing members 56 and 57 secured together by threaded rods 58 and nuts 59. Positioned between the casing members 56 and 57 and fixedly secured to these is a member 65 having an extension 7 thereon which is in turn secured to the other arm 28 by a key 29. Bearing 8 is mounted on the member 65 and in the outer drum wall 23 to support rotatably this end of the drum. The member 65 is preferably hollowed out to admit of certain mechanism with which this invention is not concerned; an open end on the member is closed by cap 70.

The speed change unit 2 includes a shaft 9 having a tongue 50 fitting into a groove 21 in one end of motor shaft 6 to provide a readily separable connection between the prime mover and the speed change device whereby one can be removed without disturbing the other. Surrounding shaft 9 is a tubular extension 14 formed integrally with plate 15 and in which shaft 9 is mounted for rotation by bearings 16 and 18. Gear 10 is mounted on the extending end of shaft 9 and is enmeshed with gear 11 on a countershaft 67, the latter being mounted in bearings 19 in the speed change device casing. The countershaft 67 also carries a gear 12 which is enmeshed with a gear 13 on the tubular extension 14. In the form of the device shown, the several gears are arranged to provide a speed reduction between the prime mover shaft 6 and the extension 14 so that the drum is driven at a speed less than that of the prime mover; any desired speed change can be provided so that drum 3 is driven at the correct speed. Since the load on the prime mover power take-off shaft 6 is taken off coaxially with the shaft, the torque on the prime mover is reduced to a minimum and it is not necessary to employ a heavy, internally braced prime mover.

Power being supplied to the prime mover, as by wires 27 in case this is an electric motor, the drum will be driven at a desired rotational speed. The entire unit is self-contained and only a suitable foundation and power need be supplied for the self-contained unit to be fully operative. In case the prime mover fails or additional power is required, a supplemental prime mover can be attached readily to the extending end of shaft 6. The internal arrangement and the speed change provided by gear box 2 between the prime mover and the drum can be arranged and adapted to any given requirements.

The drum walls 22, 23 and 24 are separable, as has been indicated, so that either the motor 1 or the speed change device 2 may separately be removed for any purpose without disturbing the other. To remove the motor, for example, it is only necessary to support the drum, take away the right hand bracket 28, open wall 22 and pull the motor out; this can be achieved without disturbing the speed change unit. In like fashion, the speed change device can be taken out for repair, replacement or change of gears without the additional necessity of disconnecting the flange 15 from the center wall 24.

Each of walls 22, 23 and 24 are apertured as at 25 to permit forced air circulation through the drum to maintain the prime mover and the speed change device at a suitable operating temperature. To facilitate such circulation, air impeller blades 26 are mounted on motor shaft 6 and, with deflector 30, serve to establish and to maintain a positive air movement through the drum.

In Figures 3 and 4, I show a terminal modified from that shown in Figures 1 and 2 in that the drum is closed at the speed change device end, and is open for ventilation only at the motor end by means of a spider type construction of the end wall 22. In this form, end wall 22 is provided with a plurality of spaced and inwardly extending ears 41 secured by studs 42 to flange 43 on the drum. As appears in Figure 4, the end wall 22 and flange 43 are within the confines of the drum so that foreign material and water can enter only with difficulty. Additionally, the shroud 30 is so formed as to establish air circulation in at the top rear of the motor, through the motor shell, and out at the bottom front part of the motor. Access openings with covers 25a are provided in each end wall 22 and 23.

A novel lubrication fitting, best shown in Figures 2 and 5, is provided for the speed change device. This fitting includes a tube 31 passing through a drilled opening in bracket 28 and extension 7, and into the lower casing member 57 of the speed change device 2 and screwed into a threaded receptacle in the bottom portion of the speed change device. The lower end of the tube 31 provides a closure for drain opening 38. At the upper end of the tube 31 an enlarged portion 33 is provided with a cap 34. A dip rod 35 is threaded onto the cap 34, and breather ports 36 and 37 are formed in the cap, which encloses filter material such as cotton waste or steel wool or the like (Figure 5).

The cap and dip rod may be removed, and the oil level in the gearbox determined by inspection of the rod, oil being admitted to the tube 31 through openings 32. Oil may be added through the tube 31. To drain the gearbox, a tube is passed through an end wall opening and is screwed into the drain 38; upon unscrewing the tube 31, the oil can be removed and replaced.

In that form of the invention shown in Figure 6 an outer driven drum, generally indicated by numeral 107, is provided and is driven by an electric motor 108 through a speed change device generally indicated at 109. Drum 107 includes opposite end walls 111 and 112, the former being mounted for rotation upon tapered roller bearings 114 and the latter being supported for rotation about bearing 116 as will presently appear. Bearing 114 is supported upon a first tubular extension 117 while bearing 116 is mounted upon a second extension 118, which are in turn fixedly supported in brackets 119 carried by a suitable base (not shown). The drum walls 111 and 112 are joined together with through bolts 121; each wall is also formed with a circular flange 122 thereon, the bolts 121 retaining a shell 123 in position to provide a power take-off means. Shell 123 can be in drum form or it can be a sprocket or gear or other suitable power take-off means carried by or in engagement with the shell.

The prime mover includes a housing 131 of which extension 117 is an integral portion. In the electric motor shown is mounted within a stator 132 the housing 131 and a rotor 133 is mounted upon motor shaft 134, the latter being carried in the bearing 136 in end bell 137 on casing 131 and in a bearing 138 which is carried in an end wall 139 on the speed change device 109. Leads 140 extend from the motor through the tubular extension 117.

The speed change device 109 includes end wall 193, a generally tubular side wall 141 and another end wall 142; end wall 139 includes the tubular extension 118 thereon which extends from end wall 139, past end wall 142 for fixed support by bracket 119, as has been previously described; the end of tubular extension 118 is closed by cap 160. End wall 139 includes a flange 150 thereon and which fits within motor casing 131 to which it is secured by studs 155. The motor and the speed change unit can thus be made up, tested and handled as a suit.

Suitable speed change mechanism is included in the speed change device 109 and in the device shown this includes a pinion 151 mounted upon the motor shaft 134 and fitting in a relieved portion of the coaxial tubular extension 118 and in driving engagement with a gear 152 mounted upon a countershaft 153; the latter is carried by bearings 154 and 156, mounted respectively in end wall 139 and end wall 142. Another gear 157 is carried by the countershaft 153 and is in driving engagement with a gear 158. Gear 158 is formed on one end of a sleeve 161 which is coaxial with the extension 118 and which is supported on one end by a tapered roller bearing 162, provided between the gear 158 and the extension 118. At its other end, the sleeve 161 is joined by studs 163 to a coupling member 164, the latter being supported by a tapered roller bearing 116 on extension 118, a suitable seal 166 being provided to protect the bearing 116. A flexible driving connection is provided by studs 171 which extend from a flange 172 on the coupling member 164 through rubber bushings 173 provided in wall 112.

To permit ready air circulation, a plurality of apertures 181 are provided in wall 112, while apertures 182 are provided in wall 111. Rotor 133 includes a fan 191 rotating in a housing 192 and effective to cause an air circulation through the device, the air is drawn in through aperture 182 in fan 191 and ejected by the fan along the line of the stator 131 around housing 109 and out through apertures 181.

To permit ready lubrication of the speed change device, a removable plug 183 is provided in an upper portion of the side wall 141, access to this being gained through one of the apertures 181. A drain connection 186 and a sight glass 187 are provided upon a lower portion of the speed change device 109 so that the oil level can be ascertained and the oil changed when desired by removing a plug 188 in the connection 186.

The foregoing device is relatively rugged and yet is exceedingly simple to assemble and maintain; it contains relatively few bearings. The size of the outer steel drum 123 can be readily varied by changing the size of walls 111 and 112 and by selecting another size of cylindrical steel shell 123; the through bolts 121 enable the end walls 111 and 112 to be drawn tightly into engagement with the drum ends. This engagement is increased by screws 194 on walls 111 and 112 and which are screwed into engagement with the drum ends after the through bolts are tightened. The through bolts and screws are preferably staggered about the drum periphery, eight of each in each wall usually sufficing. Connection is made between the speed change device and the wall 112 merely by making up the connection between the flexible coupling and the wall. The end brackets 119 employed to support the unit can be of any size or can be located upon any desired fixed support.

Compactness of the design is such that I am able to provide a standard 5-horsepower motor and an adequate reduction gear in a pulley of 2-inch diameter and 22-inch length, maximum dimension in any direction of 30 inches, whereas comparable installation such as described above involves such overall dimensions as 70 by 35, 42 by 46, and 54 by 46, all dimensions in inches. This compactness serves well in many situations, as in mine tunnels, conveyors for objects which overhang the belt and would be interfered with by machine elements projecting above the surface of the pulley, etc. The entire unit can be moved into position readily for it can be rolled along a supporting surface like a drum or a barrel; this reduces transportation and installation costs.

As will be apparent, the electric motor is exemplary only, inasmuch as any other form of prime mover may be employed, for example, a gasoline engine, the fuel and exhaust being supplied and taken away in a manner similar to that shown for providing electric current to the motor. Similarly, a hydraulic motor can be utilized. I contemplate, however, that electric motors will suffice in most installations. The device may be used as a cable drum, or alternatively as a winch, or by mounting on a vertical axis be used as a cathead, the configuration of the drum being properly made.

The speed change unit 109 is readily assembled, wall 139 being secured by spaced studs 193 to side wall 141. The motor and speed change unit can be assembled and tested as a unit; when it is desired to complete the structure this unit is placed within a suitable drum. The driving connection between the drum and speed unit can be made by any type of flexible coupling.

It is believed apparent that the various objects referred to hereinabove have been obtained in the structure described, and that I have provided a packaged power unit capable of widely diversified utilization.

This is a continuation-in-part of abandoned application Serial No. 32,846, filed June 14, 1948.

I claim:

1. In a device of the character described; a prime mover including a casing having a first extension thereon and a drive shaft; a speed change unit including a casing having a second extension thereon; means fixedly supporting the first and the second extensions; a drum having a first and a second end wall; a first bearing mounting the first end wall on the first extension; a second bearing mounting the second end wall on the second extension; the first and the second extensions, the first and the second bearings and the drum being coaxial with the prime mover shaft; a first gear driven by the prime mover drive shaft; a second gear coaxial with the prime mover drive shaft; means connecting said second gear to the drum to drive the drum; and gearing connecting the first gear and the second gear to drive the second gear from the first gear.

2. In a device of the character described; a prime mover including a casing having a first extension thereon and a drive shaft; a speed change unit including a casing having a second extension thereon; means fixedly supporting the first and the second extensions; a drum having a first and a second end wall; a first bearing mounting the first end wall on the first extension; a second bearing mounting the second end wall on the second extension; the first and the second extensions, the first and the second bearings and the drum being coaxial with the prime mover shaft; a first gear driven by the prime mover drive shaft; a second gear coaxial with the prime mover drive shaft; a tubular member coaxial with the drive shaft and secured to said second gear and to the drum to connect said second gear to the drum to drive the drum; and gearing connecting the first gear and the second gear to drive the second gear from the first gear.

3. In a device of the character described; a prime mover including a casing having a first extension thereon and a drive shaft; a speed change unit including a casing having a first and a second end wall; a bearing in the first wall for the prime mover drive shaft; a second extension on the first end wall; the prime mover casing being secured to the first end wall of the speed change unit casing; means fixedly supporting the first and the second extensions; a drum having a first and a second end wall; a first bearing mounting the first end wall of the drum on the first extension; a second bearing mounting the second end wall of the drum on the second extension; the first and the second extensions, the first and the second bearings and the drum being coaxial with the prime mover shaft; a first gear on the prime mover drive shaft; a second gear coaxial with the prime mover drive shaft; means connecting said second gear to the drum to drive the drum; and gearing connecting the first gear and the second gear to drive the second gear from the first gear.

4. In a device of the character described; a prime mover including a casing having a first extension thereon and a drive shaft; a speed change unit including a casing having a second extension thereon; means fixedly supporting the first and the second extensions; a drum having a first and a second end wall; a first bearing mounting the first end wall on the first extension; a second bearing mounting the second end wall on the second extension; the first and the second extensions, the first and the second bearings and the drum being coaxial with the prime mover shaft; a first gear on the prime mover drive shaft; a second gear coaxial with the prime mover drive shaft and rotatable about said second extension; a flexible connection between the second gear and the second drum end wall connecting said second gear to the drum to drive the drum; and gearing connecting the first gear and the second gear to drive the second gear from the first gear.

5. In a device of the character described; a prime mover including a casing having a first extension thereon and a drive shaft; a speed change unit including a casing having a second extension thereon; means fixedly supporting the first and the second extensions; a drum having a first and a second end wall; a first bearing mounting the first end wall on the first extension; a second bearing supporting the flexible connection and the second drum end wall on the second extension; the first and the second extensions, the first and the second bearings and the drum being coaxial with the prime mover shaft; a first gear on the prime mover drive shaft; a second gear coaxial with the prime mover drive shaft and rotatable about said second extension; a flexible connection between the second gear and the second drum end wall connecting said second gear to the drum to drive the drum; a third bearing supporting the second gear on the second extension; and gearing connecting the first gear and the second gear to drive the second gear from the first gear.

6. In a device of the character described; a prime mover including a casing having a first extension thereon and a drive shaft; a speed change unit including a casing having a second extension thereon; means fixedly supporting the first and the second extensions; a drum having a first and a second end wall; a first bearing mounting the first end wall on the first extension; a second bearing mounting the second end wall on the second extension; the first and the second extensions, the first and the second bearings and the drum being coaxial with the prime mover shaft; a first gear on the prime mover drive shaft; a second gear coaxial with the prime mover drive shaft; a third bearing supporting said second gear on said second extension; means connecting said second gear to the drum to drive the drum; said second bearing supporting said connecting means on said second extension; and gearing connecting the first gear and the second gear to drive the second gear from the first gear.

7. In a device of the character described; a prime mover including a casing having a first extension thereon and a drive shaft; a speed change unit including a casing fixedly secured to the prime mover casing and having a first end wall supporting the prime mover shaft and having a second extension thereon; means fixedly supporting the first and the second extensions; a drum having a first and a second end wall; a first bearing mounting the first end wall on the first extension; a second bearing mounting the second end wall on the second extension; the first and the second extensions, the first and the second bearings and the drum being coaxial with the prime mover shaft; a first gear on the prime mover drive shaft; a second gear coaxial with the prime mover drive shaft; a tubular extension on said second gear rotatable about the second extension; a third bearing supporting said tubular extension on said second extension; and a driving and supporting connection between said tubular connection and said second drum end wall connecting said second gear to the drum to drive the drum; and gearing connecting the first gear and the second gear to drive the second gear from the first gear.

8. In a device of the type described, a motor having a shell and a shaft both ends of which extend from the shell, a first extension on one side of said shell, a first bearing on said first extension and concentric with said shaft, a gearbox having a case, concentric and axially aligned inner and outer driven and driving shafts extending from one side of the gearbox case, a second extension on the other side of said gearbox case, a second bearing on said second extension concentric with said shafts, said motor shaft being aligned with and having a driving connection with said inner driven gearbox shaft, a gear train between said driven and driving gearbox shafts, and a drum surrounding said motor and said gearbox case and having opposite end walls carried on said first and second bearings and a center wall driven by said outer driving gearbox shaft.

9. In a device of the type described, a motor having a shell including an extension, and a shaft opposite said extension; a gearbox having a case including an extension, and concentric high-speed and low-speed shafts opposite said extension, all said shafts and said extensions being in alignment and the inner gearbox shaft being driven by the motor shaft; a drum surrounding said motor and said gearbox case and having a center and two end walls, said end walls being carried by bearings on said extensions, said center wall being driven by the outer of said gearbox shafts, and said drum and end walls completely surrounding and enclosing said motor and gearbox.

10. In a power terminal of the type described, a prime mover having a driving shaft and a casing, a first extension on the casing concentric with said shaft, a reduction gearbox having a casing and an input shaft, a second extension on said gearbox casing concentric with said input shaft, said gearbox including a countershaft, an output shaft concentric with said input shaft, meshed gears on said input, output, and counter shafts constituting a driving connection between the input and output shafts, and said input and output shafts each extending from said gearbox casing opposite said extension thereof, a coaxial driving connection between said prime mover shaft and said input shaft, a drum surrounding said prime mover and said gearbox and having end walls, bearings carrying said end walls on said extensions, a center wall in said drum between said prime mover and said gearbox, and a driving connection between said output shaft and said center wall.

11. In a device of the character described, a prime mover having a casing and a rotatable shaft, a base, a first bracket on the base, means mounting said prime mover casing fixedly in said first bracket, a first bearing mounted on said prime mover casing, a speed change device having a casing and a rotatable shaft slidably engaged in coaxial alignment with said prime mover shaft, a second bracket on said base, means mounting said speed change device casing fixedly in said second bracket, a second bearing mounted on said speed change device casing, a drum surrounding said prime mover and said speed change device and positioned coaxially with respect to said shafts and having a first and a second end wall supported respectively on said first and said second bearings, and means connecting said drum to said speed change device for driving by said change device.

12. In a device of the character described, a prime mover having a casing and a first rotatable shaft, a base, a first bracket on the base, means mounting said prime mover casing fixedly in said first bracket, a first bearing mounted on said prime mover casing, a speed change device having a casing and a second rotatable shaft detachably engaged with and in coaxial alignment with said prime mover shaft, a second bracket on said base, means mounting said speed change device casing fixedly in said second bracket, a second bearing mounted on said speed change device casing, a drum surrounding said prime mover and said speed change device and positioned coaxially with respect to said shafts and having a first and a second end wall supported respectively on said first and said second bearings, a third wall mounted internally of said drum and having a tubular extension extending therefrom in coaxial alignment with said second rotatable shaft, and gear means mounted on said second shaft and on said extension for driving the extension from the second shaft.

13. In a device of the character described, a prime mover having a casing and a first rotatable shaft, a base, a first bracket on the base, means mounting said prime mover casing fixedly in said first bracket, a first bearing mounted on said prime mover casing, a speed change device having a casing and a second rotatable shaft slidably engaged in coaxial alignment with said prime mover shaft, a second bracket on said base, means mounting said speed change device casing fixedly in said second bracket, a second bearing mounted on said speed change device casing, a drum surrounding said prime mover and said speed change device and positioned coaxially with respect to said shafts and having a first and a second end wall supported respectively on said first and said second bearings, a third wall mounted internally of said drum, a countershaft in said speed change device casing, a tubular extension on said third wall coaxial with said first and second shafts, and gear means on said second shaft, the countershaft and the tubular extension for driving the drum.

14. In a device of the character described, a prime mover having a casing and a first rotatable shaft in said casing supported in a bearing at one end of the shaft, a base, a first bracket on the base, means mounting said prime mover casing fixedly in said first bracket, a first bearing mounted on said prime mover casing, a speed change device having a casing and a second rotatable shaft slidably engaged in coaxial alignment with said prime mover shaft, a second bracket on said base, means mounting said speed change device casing fixedly in said second bracket, a second bearing mounted on said speed change device casing, a drum surrounding said prime mover and said speed change device and positioned coaxially with respect to said shafts and having a first and a second end wall supported respectively on said first and said second bearings and a third wall intermediate the ends of the drum, a bearing in said third wall for supporting the other end of the prime mover shaft, and gear means on said second shaft and on said third wall for driving the drum from the prime mover shaft.

15. In a device of the character described, a prime mover having a casing and a rotatable shaft, a base, a first bracket on the base, means mounting said prime mover casing fixedly in said first bracket, a first bearing mounted on said prime mover casing, a speed change device having a casing and a rotatable shaft slidably engaged in coaxial alignment with said prime mover shaft, a second bracket on said base, means mounting said speed change device casing fixedly in said second bracket, a second bearing mounted on said speed change device casing, a drum positioned coaxially with respect to said shafts and having a first and a second end wall supported respectively on said first and said second bearings, means connecting said drum to said speed change device for driving by said change device, said speed change casing including a tube extending downwardly and in threaded engagement with the casing to provide a closure for a drain opening in the casing, said tube being open to the casing to admit oil from the casing into the tube.

16. In combination, a drum having a wall intermediate the ends thereof, said wall having a tubular extension thereon coaxial with the drum and extending toward an end of the drum, a first end wall at one end of the drum, a second end wall at the other end of the drum, a base, a motor having a casing supported fixedly at one end on the base, a shaft in said motor, a first bearing in said intermediate wall supporting an end of said motor shaft, a speed change device having a casing supported fixedly at one end of the base, a slidably detachable driving connection between the speed change device and the motor shaft, a second bearing on said motor casing supporting said first end wall for rotation, a third bearing on said speed change device casing supporting said second end wall for rotation, and a fourth bearing on said tubular extension for supporting said speed change device casing.

17. In combination, a drum having a wall intermediate the ends thereof, said wall having a tubular extension thereon coaxial with the drum and extending toward an end of the drum, a first end wall at one end of the drum, a second end wall at the other end of the drum, a base, a motor having a casing supported fixedly at one end of the base, a shaft in said motor, a first bearing in said intermediate wall supporting an end of said motor shaft, a speed change device having a casing supported fixedly at one end on the base, a slideably detachable driving connection between the speed change device and the motor shaft, a second bearing on said motor casing supporting said first end wall for rotation, a third bearing on said speed change device casing supporting said second end wall for rotation, a gear on said tubular extension, and a chain of gears including a gear driven by the motor shaft for driving the gear on the tubular extension.

18. In combination, a drum having a wall intermediate the ends thereof, said wall having a tubular extension thereon coaxial with the drum and extending toward an end of the drum, a first end wall at one end of the drum, a second end wall at the other end of the drum, a base, a motor having a casing supported fixedly at one end on the base, a shaft in said motor, a first bearing in said intermediate wall supporting an end of said motor shaft, a speed change device having a casing supported fixedly at one end on the base, a second bearing on said motor casing supporting said first end wall for rotation, a third bearing on said speed change device casing supporting said second end wall for rotation, a fourth bearing on said tubular extension for supporting said speed change device casing, a countershaft supported for rotation in said speed change device casing, a second shaft extending through said tubular extension and engaged with said motor shaft for driving by said motor shaft, a first gear on said second shaft, a second gear on said tubular extension, and gearing on said countershaft for driving the second gear from the first gear.

19. In a device of the character described; a prime mover including a casing having a first extension thereon; a speed change unit including a casing having a second extension thereon; a drive shaft in the prime mover extending operatively into the speed change unit casing; a first gear in said speed change unit casing and driven by said drive shaft; means fixedly supporting the first and the second extensions; a drum having a first and a second end wall; a first bearing mounting the first end wall on the first extension; a second bearing mounting the second end wall on the second extension; the first and the second extensions, the first and the second bearings and the drum being coaxial with the prime mover drive shaft; an annular gear coaxial with the prime mover drive shaft; an annular sleeve connecting said annular gear to the drum to drive the drum; and gearing connecting the first gear and the annular gear to drive the annular gear from the first gear.

20. In a device of the character described; a prime mover including a casing having a first extension thereon and a drive shaft; a speed change unit including a casing having a second extension thereon; a drive shaft in the prime mover extending operatively into the speed change unit casing; a first gear in said speed change unit casing and driven by said drive shaft; means fixedly supporting the first and the second extensions; a drum having a first and a second end wall; a first bearing mounting the first end wall on the first extension; a second bearing mounting the second end wall on the second extension; the first and the second extensions, the first and the second bearings and the drum being coaxial with the prime mover drive shaft; a tubular gear coaxial with the prime mover drive shaft; a tubular member coaxial with the drive shaft and secured to said tubular gear and to the drum to connect said tubular gear to the drum to drive the drum; and gearing connecting the first gear and the tubular gear to drive the tubular gear from the first gear.

JOSEPH D. CHRISTIAN.

REFERENCES CITED

The following references are of record in the file of this patent:

UNITED STATES PATENTS

| Number | Name | Date |
|---|---|---|
| 1,165,814 | Tadey | Dec. 28, 1915 |
| 1,323,245 | Borkes | Dec. 2, 1919 |
| 1,876,767 | Selden | Sept. 13, 1932 |
| 2,354,387 | Lawler | July 25, 1944 |
| 2,439,520 | Miller | Apr. 13, 1948 |